No. 845,921. PATENTED MAR, 5, 1907.
J. C. BARKER.
ANIMAL TRAP.
APPLICATION FILED MAY 21, 1906.

2 SHEETS—SHEET 1.

Witnesses

Inventor
J. C. Barker
By _____, Attorney

No. 845,921. PATENTED MAR. 5, 1907.
J. C. BARKER.
ANIMAL TRAP.
APPLICATION FILED MAY 21, 1906.

2 SHEETS—SHEET 2.

Witnesses

Inventor
J. C. Barker
By Lacey, Attorney

THE NORRIS PETERS CO., WASHINGTON, D.C.

__UNITED STATES PATENT OFFICE.__

JOSEPH C. BARKER, OF OBLONG, ILLINOIS.

ANIMAL-TRAP.

No. 845,921.

Specification of Letters Patent.

Patented March 5, 1907.

Application filed May 21, 1906. Serial No. 318,022.

*To all whom it may concern:*

Be it known that I, JOSEPH C. BARKER, a citizen of the United States, residing at Oblong, in the county of Crawford and State of Illinois, have invented certain new and useful Improvements in Animal-Traps, of which the following is a specification.

This invention relates to an improved animal-trap which is so constructed as to automatically reset itself after the capture of each animal, so as to continue in operation indefinitely without any attention on the part of the operator.

The object of the invention is to so design the trap as to comprise few and simple parts, which will readily withstand any hard usage to which they may be subjected, and which can be cheaply manufactured.

To this end the trap comprises, essentially, a series of plates located within the casing and adapted to form when set a continuous partition dividing the casing into two compartments, one of which has communication with the entrance of the trap, while the opposite compartment communicates with the outlet, the plates being so arranged as to automatically close the entrance after the animal has reached the interior of the trap and to open a passage through which the animal may reach the outlet and pass out into the cage or inclosure, means being provided whereby the trap will be reset when the animal passes through the said outlet.

For a full description of the invention and the merits thereof and also to acquire a knowledge of the details of construction of the means for effecting the result reference is to be had to the following description and accompanying drawings, in which—

Figure 1:
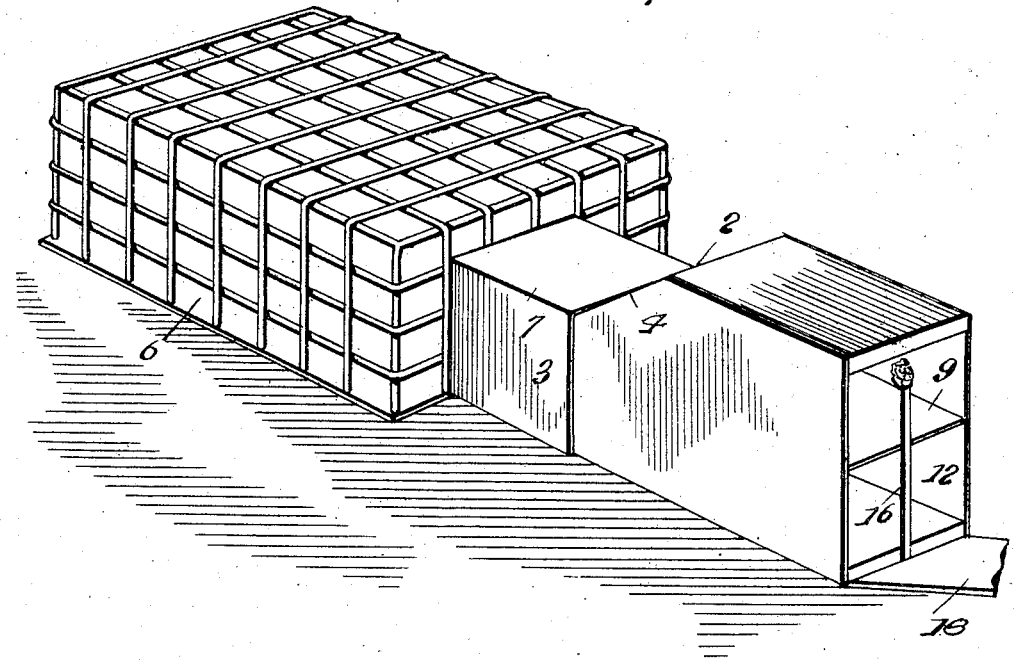
Figure 2:
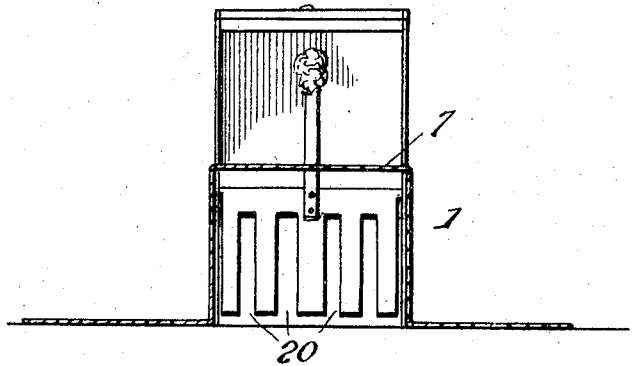
Figure 3:
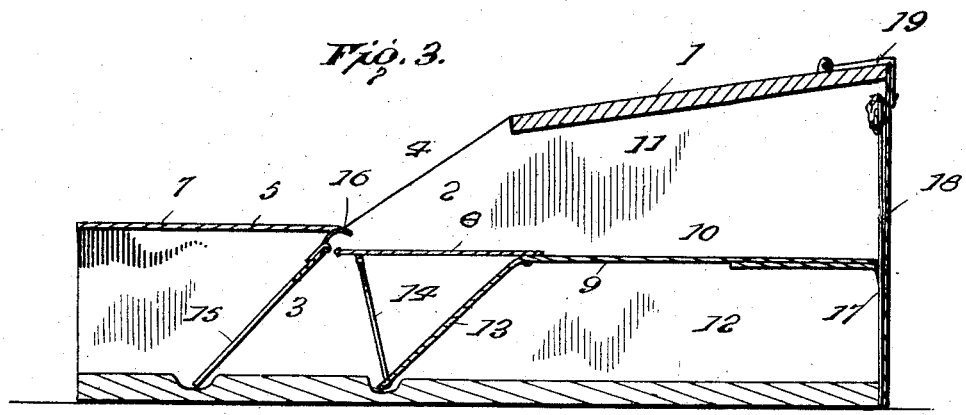
Figure 4:
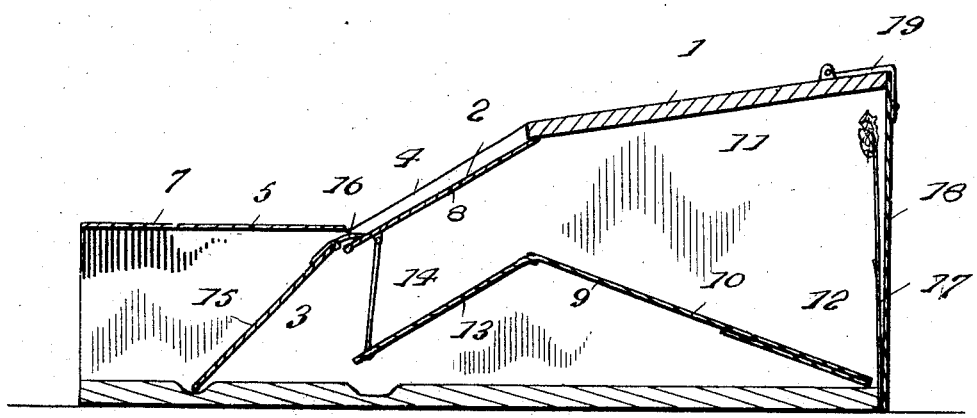

Figure 1 is a perspective view of a trap constructed in accordance with the invention. Fig. 2 is a transverse sectional view through the outlet to the trap. Fig. 3 is a longitudinal sectional view showing the trap when set, and Fig. 4 is a similar view showing the trap when sprung.

Corresponding and like parts are referred to in the following description and indicated in all the views of the drawings by the same reference characters.

The trap mechanism is located within the casing 1, which is provided at one end with an entrance 2 and an outlet 3, which is located just below the entrance. It will be observed that the sides of the casing 1 are cut away toward the forward end thereof, so as to form the inclined edges 4, which are adjacent the entrance 2, and the approximately horizontal edges 5, which are adjacent the outlet. This outlet 3 leads into an inclosure or cage 6 of any suitable nature and is covered by a platform 7, by means of which the animal is enabled to reach the entrance 2. A plate 8 has its lower end pivotally mounted between the sides of the casing at a point near the junction of the inclined edges 4 and horizontal edges 5 of the cut-away portion of the sides, and the said plate 8 is so arranged as to swing upwardly into contact with the top of the casing and close the entrance 2 when the trap is sprung. The treadle 9 is also pivotally mounted at an intermediate point between the sides of the casing and comprises two arms, which are arranged at angles to each other, the rear arm 10 being in the nature of a plate, which when the trap is set forms a partition or flooring between the walls of the casing. The plate 8 is adapted to be swung back so that the free end thereof will rest upon the pivot portion of the treadle 9, and when in this position a continuous partition is formed, which leads from the front to the rear of the trap and divides the latter into two compartments, the upper compartment 11 being in communication with the entrance 2, while the lower compartment 12 is in communication with the outlet 3. The forward arm 13 of the treadle 9 is arranged at an angle to the rear arm 10 and normally extends obliquely downward into engagement with the bottom of the casing. The free end of the forward arm 13 is connected to the plate 8 by means of a link member 14, so that when the rear arm 10 of the treadle is forced downwardly by the weight of the animal the plate 8 will be forced upwardly through the link 14, so as to close the entrance 2. This operation will at the same time open a passage between the compartment 11 and the lower compartment 12, so that the animal can pass out through the outlet 3. The gate 15, which closes the outlet, is pivoted between the sides of the casing at a point adjacent the place where the plate 8 is pivoted, and the said gate is adapted to be swung outwardly by the animal to enable it to enter the inclosure 6, but engages with the bottom of the casing to prevent the escape of the animal. An arm 16 projects upwardly from the top of the gate 15 and is curved slightly to the rear, so as to engage with the plate 8 when the gate is swung outwardly. In this manner it will be apparent that when the animal raises the gate and passes into the inclosure 6 the plate 8 will be pushed downwardly and the trap reset should the animal have failed to reset the trap while passing from the upper to the lower compartment, as will be hereinafter described. The bait is placed upon the extremity of a spring-arm 17, which is secured to the bottom of the casing and projects upwardly, so as to terminate at the rear end of the upper compartment. This spring-arm 17 is adapted to engage with the rear arm 10 of the treadle 9 and to hold the same in a raised position when the trap is set. However, when the animal enters the trap and attempts to take the bait the spring-arm is disengaged from the treadle and the rear arm 10 thereof allowed to drop. This causes the forward arm 13 of the treadle 9 to swing upwardly and close the entrance through the medium of the plate 8 and link 14 and at the same time communication is formed between the upper compartment 11 and the lower compartment 12. In reaching the outlet of the trap the animal must necessarily pass over the forward arm 13 of the treadle, and the weight of the animal upon this arm will swing the arm 10 up into engagement with the spring-arm 17, so as to again set the trap, and will also throw the plate 8 down so as to open the entrance to the trap. Should the captured animal again force its way into the upper compartment, it will of necessity raise the plate 8 and spring the treadle out of engagement with the bait-arm, and thus again close the trap.

The back of the casing 1 is closed by means of a door 18, which may be pivoted at the lower portion thereof so as to swing outwardly and allow ready access to be had to the interior of the trap in order to place the bait in position or for repairing purposes. This door 18 is shown as normally held in position by means of a hook 19. The gate 15 at the outlet 3 is preferably formed with a series of slots 20, which extend entirely to the bottom of the gate and serve the double function of admitting light to the interior of the trap and of forming guideways which will facilitate the opening of the gate by the animal.

In the operation of the trap it will be readily understood that when the animal reaches the rear of the upper compartment 11 and attempts to take the bait the treadle 9 will be disengaged from the spring-arm 17 and will fall downwardly, so as to close the entrance 2 and lower the animal out of reach of the bait. The animal then follows its natural instinct and seeking the light passes through the gate 5 into the closure 6 and at the same time automatically resets the trap, as has been heretofore described, so that it is ready for the next animal without any attention on the part of the operator.

Having thus described the invention, what is claimed as new is—

1. A trap comprising a casing, a partition dividing the casing into two compartments one of which has communication with the entrance while the opposite compartment communicates with the outlet, said partition being formed by a plate which is movably mounted so as to close the entrance, and a treadle which is adapted to throw the plate around so as to close the entrance and open a passage between the two compartments after the animal has entered the trap.

2. A trap comprising a casing, a partition dividing the casing into two compartments one of which has communication with the entrance while the opposite compartment communicates with the outlet, said partition being formed by a plate which is movably mounted so as to close the entrance, and by a treadle which is adapted to throw the plate around so as to close the entrance and open a passage between the two compartments after the animal has entered the trap, and a gate closing the outlet and adapted to reset the trap after the passage of the animal therethrough.

3. A trap comprising a casing, a partition dividing the casing into two compartments one of which has communication with the entrance while the opposite compartment communicates with the outlet, said partition being formed of a plate which is pivotally mounted so as to close the entrance, and also out of one arm of a treadle which is pivotally mounted at an intermediate point, a link member connecting the opposite arm of the treadle to the plate whereby the treadle will operate to swing the plate around so as to close the entrance and form a passage between the two compartments after the animal has entered the trap, and means whereby the trap will be automatically reset when the animal passes through the outlet.

4. A trap comprising a casing, a partition dividing the casing into two compartments one of which has communication with the entrance while the opposite compartment communicates with the outlet, said partition being formed of a plate which is pivotally mounted so as to close the entrance, and also out of one arm of a treadle which is pivotally mounted at an intermediate point, a link member connecting the opposite arm of the treadle to the plate whereby the treadle will operate to swing the plate around so as to close the entrance and form a passage between the two compartments after the animal has entered the trap, an outwardly-swinging gate closing the outlet, and an arm projecting from the gate and adapted to engage with the plate so as to automatically reset the trap when the gate is opened.

5. A trap comprising a casing having an entrance and an outlet, a plate pivotally mounted between the sides of the casing so as to swing around and close the entrance, a treadle pivotally mounted at an intermediate point between the sides of the casing and comprising two arms one of which normally engages with the bottom of the casing while the opposite arm in conjunction with the before-mentioned plate normally forms a partition which divides the trap into two compartments one of which communicates with the outlet while the opposite compartment communicates with the entrance, means whereby the plate will be swung around so as to close the entrance and form a passage between the two compartments when the treadle is forced down by the weight of the animal, a gate closing the outlet, and an arm projecting from the gate and adapted to engage with the plate so as to reset the trap when the gate is opened.

6. A trap comprising a casing, a partition dividing the casing into two compartments one of which has communication with the entrance while the opposite compartment communicates with the outlet, said partition being formed out of a plate which is pivotally mounted so as to swing around and close the entrance, and also out of one arm of a treadle which is pivotally mounted at an intermediate point between the sides of the casing, a bait-arm at the rear end of the trap which is adapted to engage with one arm of the treadle to hold the treadle in a set position, and connecting means between the opposite arm of the treadle and the before-mentioned plate whereby the treadle will swing around so as to lower the animal out of reach of the bait and cause the before-mentioned plate to close the entrance when the trap is sprung.

7. A trap comprising a casing, a partition dividing the casing into two compartments one of which has communication with the entrance, while the opposite compartment communicates with the outlet, said partition being formed by a plate which is movably mounted so as to close the entrance, and by a treadle which is adapted to throw the plate around so as to close the entrance and open a passage between the two compartments for the animal as it enters the trap, and means whereby the trap will be reset when the animal passes through the outlet.

In testimony whereof I affix my signature in presence of two witnesses.

JOSEPH C. BARKER. [L. S.]

Witnesses:
 E. T. Shire,
 J. C. Shire.